(12) United States Patent
Lacko et al.

(10) Patent No.: US 12,275,279 B2
(45) Date of Patent: Apr. 15, 2025

(54) PNEUMATIC TYRE FOR A VEHICLE

(71) Applicant: Continental Reifen Deutschland GmbH, Hannover (DE)

(72) Inventors: Peter Lacko, Puchov (SK); Michal Vojtus, Puchov (SK); Spencer Shadomy, Fort Mill, MI (US); Nico Meier, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/247,064

(22) PCT Filed: Sep. 21, 2021

(86) PCT No.: PCT/DE2021/200124
§ 371 (c)(1),
(2) Date: Mar. 28, 2023

(87) PCT Pub. No.: WO2022/068998
PCT Pub. Date: Apr. 7, 2022

(65) Prior Publication Data
US 2023/0373254 A1 Nov. 23, 2023

(30) Foreign Application Priority Data
Oct. 1, 2020 (DE) .................. 10 2020 212 456.6

(51) Int. Cl.
*B60C 11/12* (2006.01)

(52) U.S. Cl.
CPC ...... *B60C 11/1218* (2013.01); *B60C 11/1236* (2013.01); *B60C 11/1263* (2013.01);
(Continued)

(58) Field of Classification Search
CPC ............ B60C 11/1263; B60C 11/1281; B60C 11/1236; B60C 11/1218; B60C 2011/1209; B60C 2011/1213
See application file for complete search history.

(56) References Cited

U.S. PATENT DOCUMENTS

| | | | |
|---|---|---|---|
| 2003/0029537 A1* | 2/2003 | Iwamura | B60C 11/12 152/209.18 |
| 2006/0169376 A1* | 8/2006 | Sundkvist | B60C 11/1263 152/DIG. 3 |

(Continued)

FOREIGN PATENT DOCUMENTS

| | | |
|---|---|---|
| CN | 104024002 A | 9/2014 |
| EP | 3415343 A1 | 12/2018 |
| WO | 2015128106 A1 | 9/2015 |

OTHER PUBLICATIONS

The International Search Report and the Written Opinion of the International Searching Authority mailed on Sep. 21, 2021 for the counterpart PCT Application No. PCT/DE2021/200124.
(Continued)

*Primary Examiner* — Steven D Maki

(57) ABSTRACT

A tire having a tread with profile rib traversed by sipes, which extend parallel to one another and at an angle of 0° to 50° relative to the axial direction and have a width of 0.4 mm to 3.0 mm. Each sipe has a sipe main portion extending over the majority of its extent and via a respective sipe edge portion leads into each circumferential groove delimiting the profile rib. The sipe main portion and the sipe edge portion have a respective depth in which the depth of the sipe main portion is less than the depth of the sipe edge portion. In the interior of the profile rib, the sipe edge portion over its entire extent leads into a cavity that extends from the circumferential groove and is made wider than the sipe.

15 Claims, 3 Drawing Sheets

Figure 1:
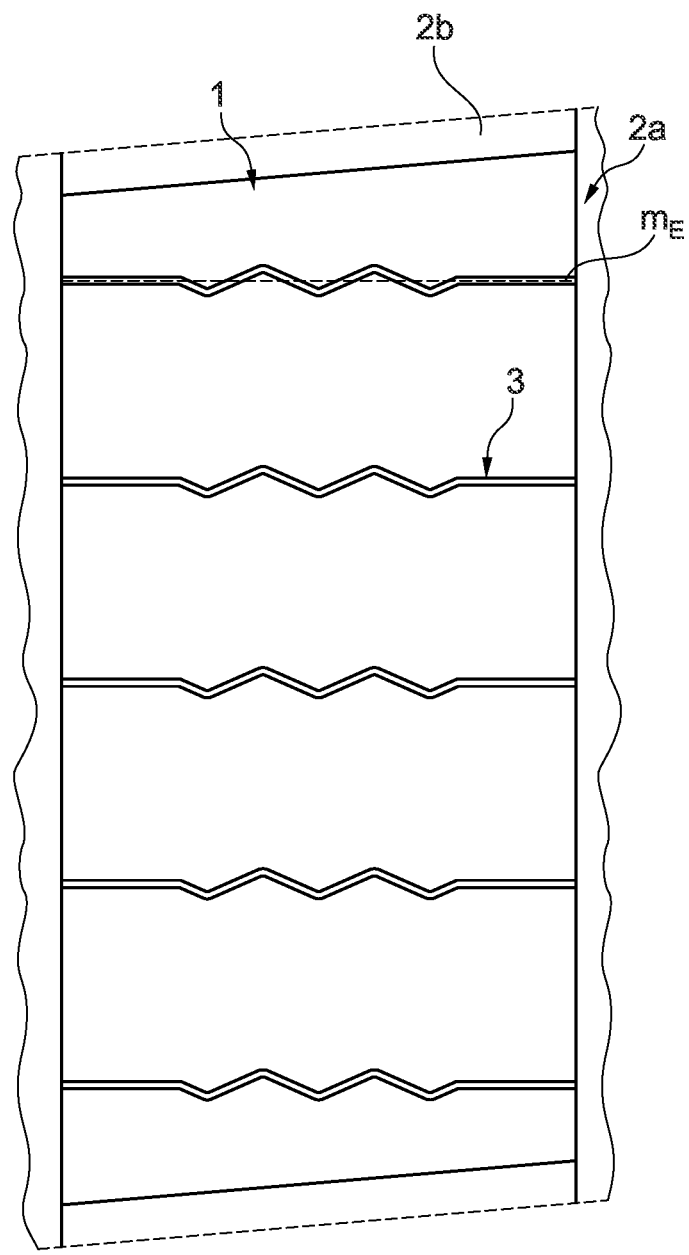

(52) U.S. Cl.
CPC ... *B60C 11/1281* (2013.01); *B60C 2011/1209* (2013.01); *B60C 2011/1213* (2013.01)

(56) References Cited

U.S. PATENT DOCUMENTS

| | | |
|---|---|---|
| 2011/0108176 A1 | 5/2011 | Nakamizo |
| 2012/0234443 A1* | 9/2012 | Kurokawa .......... B60C 11/1281 152/209.18 |
| 2014/0166173 A1* | 6/2014 | Dayet ................ B60C 11/1263 152/209.25 |
| 2017/0253090 A1 | 9/2017 | Wakizono |
| 2019/0084352 A1 | 3/2019 | Kujime |
| 2023/0084725 A1* | 3/2023 | Voss ................... B60C 11/1281 152/209.18 |

OTHER PUBLICATIONS

Chinese Office Action dated Jan. 13, 2025 for the counterpart Chinese Patent Application No. 202180066365.2.

\* cited by examiner

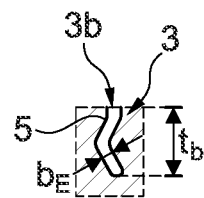
Fig. 5 : V-V
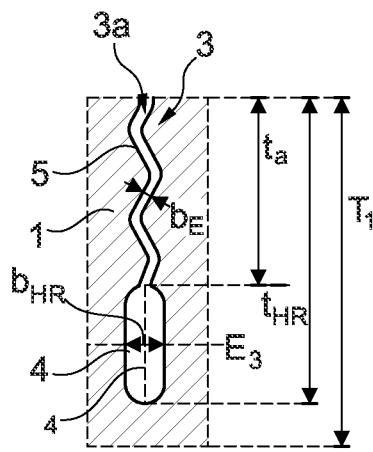
Fig. 6 : VI-VI
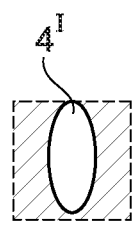
Fig. 7a
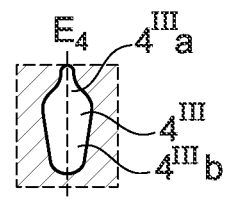
Fig. 7c
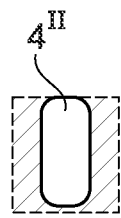
Fig. 7b
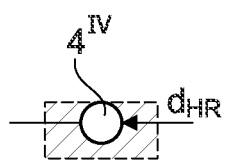
Fig. 7d

PNEUMATIC TYRE FOR A VEHICLE

The invention relates to pneumatic vehicle tires, in particular utility vehicle tires, having a tread with at least one profile rib which runs around in the circumferential direction, is delimited on at least one side by a circumferential groove formed to a profile depth, and is traversed by sipes, which extend parallel to one another and at an angle of 0° to 50° in relation to the axial direction at least in groups in plan view and have a width of 0.4 mm to 3.0 mm, wherein each sipe has a sipe main portion extending over the majority of its extent and by way of a respective sipe edge portion leads into each circumferential groove delimiting the profile rib, wherein the sipe main portion and the sipe edge portion have a respective depth in a radial direction and the depth of the sipe main portion differs from the depth of the sipe edge portion.

A pneumatic vehicle tire of the type mentioned in the introduction, which can be a tire for passenger cars, vans or heavy trucks (utility vehicles), is known from WO 2015/128106 A1, for example. According to an exemplary embodiment, the tire has a tread with profile ribs, which are separated from one another by circumferential grooves and are divided into profile blocks by transverse grooves, wherein sipes that extend in an axial direction and have a width of 0.4 mm to 0.6 mm are formed in the profile ribs. Seen in plan view, the sipes are each composed of one sipe main portion, which extends over at least 50% of the sipe length, in the exemplary embodiment over the majority of the extent of the sipe, and two sipe edge portions, which lead into the circumferential grooves. The sipe main portion has a depth of at least 70% of the profile depth and the sipe edge portions have a depth of 30% to 70% of the depth of the sipe main portion. A depression, which is located radially within a depth of 50% of the profile depth, is surrounded at the edge by at least 2 mm of the sipe wall, and increases the water absorption capacity of the sipe, is formed in at least one sipe wall.

Providing profile ribs of treads with sipes in order to improve the gripping properties is well known. Furthermore, sipes contribute to the expulsion of water from the tread profile, and their water absorption capability decreases with increasing tread wear, as a result of which the wet gripping properties deteriorate. The sipes at the same time undesirably reduce the stiffness of the profile ribs, as a result of which the transmission of tractive force to the ground is impaired.

The invention is based on the object of enabling good wet gripping properties, whilst still retaining profile stiffness that is favorable in terms of the transmission of tractive force, as the tread wears down in the case of a pneumatic vehicle tire of the type mentioned in the introduction.

The stated object is achieved according to the invention in that the depth of the sipe main portion is less than the depth of the sipe edge portion, wherein, in the interior of the profile rib, the sipe edge portion over its entire extent leads into a cavity that extends from the circumferential groove and is made wider than the sipe.

In the case of new treads, or treads with little wear, the sipes ensure good expulsion of water from the profile ribs, in particular also on account of their ability to open up considerably when passing through the footprint, with the result that the sipe edges can optimally act as gripping edges on wet ground. The sipe main portion that is made shallower—compared to tread profiles with sipes having sipe main portions that are made deeper—ensures advantageously high stiffness of the profile rib for the transmission of tractive force, throughout the service life of the tire (as the tread wears down). As tread wear progresses further, the cavities enter the tread periphery, which continue to enable good take-up of water in the case of the profile ribs that have become stiffer owing to the tread wear on account of having a wider form than the sipes, wherein the water that is taken up is advantageously discharged directly into the circumferential groove(s). As a result, the edges that are on the tread periphery and are brought about by the cavities act as gripping edges to a particularly pronounced extent.

According to a preferred embodiment, at its widest point and as seen in the cross section of the sipe, the cavity has a width from 200% to 500%, in particular from 300% to 400%, preferably from 330% to 370%, of the width of the sipe. This contributes to good take-up of water when driving on a wet roadway, as a result of which the wet gripping properties are further improved.

It is also advantageous when, as seen in the cross section of the sipe, the cavity is circular or, in a radial direction, has a length from 25% to 45%, in particular from 30% to 40%, preferably from 33% to 37%, of the profile depth. In particular, an elongate cavity has proven to be particularly favorable in terms of the take-up of water and discharge of water toward the circumferential groove.

According to a further preferred embodiment, the cavity in a radial direction reaches to a depth of 75% to 100%, in particular up to 95%, of the profile depth. This contributes to maintaining good wet gripping properties as the tread wears down.

It is also advantageous for the transmission of tractive force if the depth of the sipe main portion is 10% to 30%, in particular up to 25%, and preferably up to 20% of the profile depth.

A compromise which is particularly advantageous in terms of the wet gripping properties and the profile stiffness relevant for the transmission of tractive force can be achieved in that the depth of the sipe edge portion is 200% to 400%, in particular 250% to 350%, particularly preferably 290% to 310%, of the depth of the sipe main portion.

According to a further preferred embodiment, as seen in the cross section of the sipe, the sipe edge portion extends in the form of a wave, in particular in the form of a harmonic wave, particularly preferably in the form of a harmonic zigzag wave or a harmonic sawtooth wave. This enables support effects of the profile rib segments formed by the sipe that are favorable in terms of the profile stiffness, in particular in the case of new tires or tires with little wear.

A further preferred embodiment is characterized in that, in plan view—with respect to its center line—, the sipe is formed as straight and, as seen in plan view, the sipe edge portion extends in a straight line. This is primarily advantageous in terms of the ability of the sipe to open up and therefore for the take-up of water, and therefore contributes to an improvement in the wet gripping properties.

According to a further preferred embodiment, as seen in plan view, the sipe main portion, at least over the majority of its extent, in particular over at least 70% of its length determined along the center line of the sipe, extends in the form of a wave, in particular in the form of a harmonic wave, particularly preferably in the form of a harmonic zigzag wave or a harmonic sawtooth wave. This measure in particular contributes to a further increase in the transverse stiffness of the profile rib.

In this embodiment, it is also favorable if the wavelength of the wave of the sipe main portion is 25% to 40%, in particular up to 33%, of the length determined along the center line of the sipe.

It is furthermore favorable in this embodiment if the amplitude of the wave of the sipe main portion is 75% to 200%, in particular 125% to 175%, of the width of the sipe.

For the stiffness of the profile rib, it is also favorable if the shape of the wave that is present in the cross section of the sipe in the sipe edge portion continues in the sipe main portion.

According to a further preferred embodiment, the sipe main portion has a length, determined along the center line of the sipe, of 65% to 90%, in particular of up to 85%, of the length of the sipe that is determined correspondingly. The sipe main portion that is made shallower therefore in this embodiment extends over the majority of the sipe, this being favorable in terms of the profile stiffness.

A further preferred embodiment is characterized in that the cavity has a plane of symmetry which extends in a radial direction and contains the center line of the sipe that is aligned in the direction of extent of the sipe in plan view.

A further preferred embodiment relates to a pneumatic vehicle tire having a tread with at least one profile rib, which is delimited on each side by a respective circumferential groove formed to a profile depth, wherein the sipes are each formed of the sipe main portion and two sipe edge portions, wherein the sipe edge portions each lead into a cavity that extends from the respective circumferential groove and is made wider than the sipe. The provision of such specially configured sipes in central profile ribs is particularly favorable because in these cases the described effects occur to a greater extent.

Figure 2:
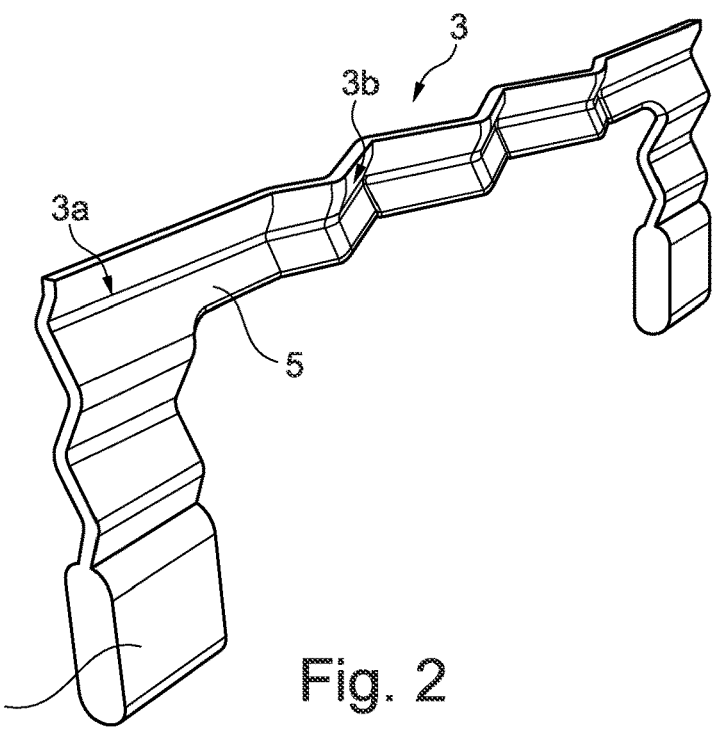
Figure 3:
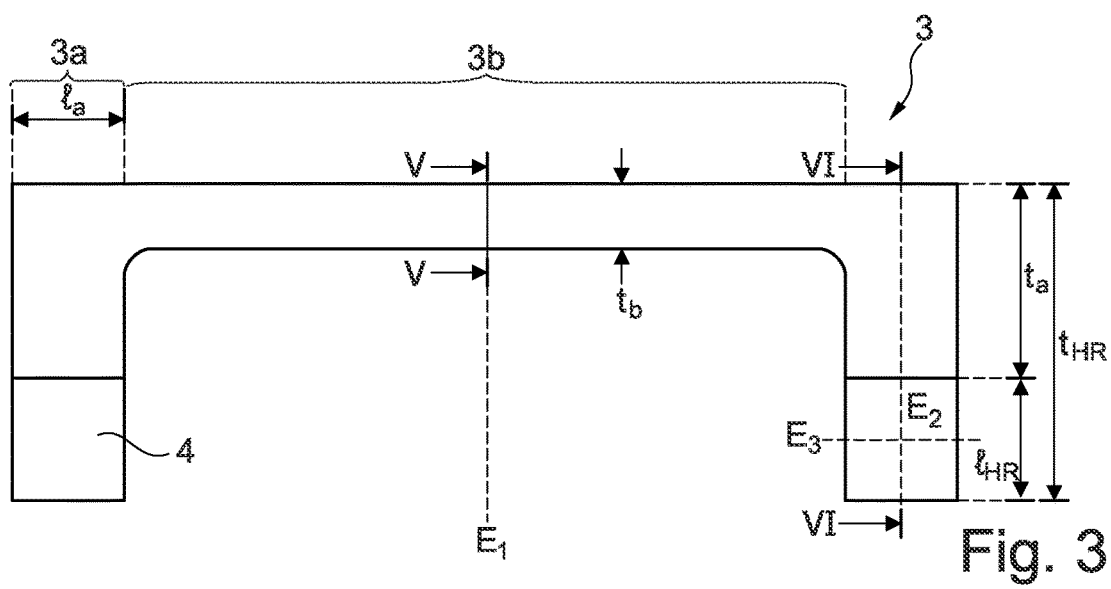
Figure 4:
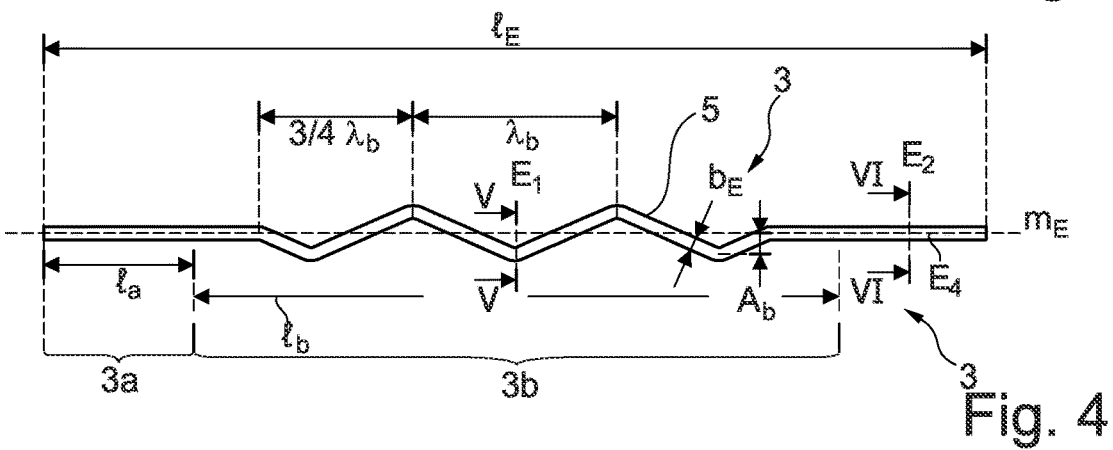

Further features, advantages and details of the invention will now be discussed in more detail with reference to the drawing, which schematically shows exemplary embodiments of the invention. In the figures:

FIG. 1 shows a simplified plan view of a profile block of a tread of a utility vehicle tire with a first embodiment variant of the invention, FIG. 2 shows an enlarged oblique view of a visualization of a sipe formed in the profile block, FIG. 3 shows a front view of the sipe visualization from FIG. 2, FIG. 4 shows a simplified plan view of the sipe visualization from FIG. 2, FIG. 5 shows a section along the line V-V from FIG. 3 and FIG. 4, FIG. 6 shows a section along the line VI-VI from FIG. 3 and FIG. 4, and FIGS. 7a to 7d show sections through a partial region of a sipe with further embodiment variants.

Pneumatic vehicle tires designed according to the invention are tires for motor vehicles, in particular for multi-track motor vehicles, and preferably utility vehicle tires of a radial design, in particular for trucks or buses.

FIG. 1 shows, from a tread of a utility vehicle tire, a profile block 1 which is formed in the central tread region, is elongate in the circumferential direction, and is a constituent part of a profile rib that runs around in the circumferential direction and is in the form of a row of blocks. The profile block 1 is laterally delimited by circumferential grooves 2a, which extend in a straight line in plan view in the case of the exemplary embodiment shown. In the circumferential directions, the profile block 1 is delimited by transverse grooves 2b, which are preferably adjoined by further profile blocks 1 that are part of the profile rib. The circumferential grooves 2 are formed to the respectively provided profile depth $T_1$ (indicated in FIG. 6) in a radial direction, which profile depth is typically 10.0 mm to 25.0 mm for utility vehicle tires.

The profile block 1 is provided with a multiplicity of sipes 3 over its circumference, which traverse the profile block 1 and—with respect to center lines $m_E$ aligned in the direction of extent of the sipes 3—extend parallel to one another in plan view and in an axial direction in the case of the exemplary embodiment. The further configuration of the sipes 3 will be discussed below with reference to the sipe 3 shown in FIGS. 2 to 6.

The sipe 3 has a plane of symmetry $E_1$ which bisects the center line $m_E$ and is spanned by the circumferential direction and the radial direction (FIGS. 3 and 4). As shown in FIGS. 2 to 4, in particular in combination, the sipe 3, as seen in plan view, is composed of two sipe edge portions 3a and one sipe main portion 3b that extends over the majority of its extent, wherein the sipe edge portions 3a in the interior of the profile block 1 over their entire extent lead into a respective cavity 4 extending from the corresponding circumferential groove 2 (FIG. 1 in conjunction with FIGS. 2 and 6).

The sipe 3 has two correspondingly formed sipe walls 5 (FIG. 2, FIGS. 4 to 6), a constant width $b_E$ determined between the sipe walls 5 (FIGS. 4 to 6) of 0.4 mm to 3.0 mm, in particular of up to 2.0 mm, and a length $l_E$ determined along the center line $m_E$ (FIG. 4).

The sipe edge portions 3a, as seen in plan view (FIG. 4), extend in a straight line and in line with one another, and have a length $l_a$, determined at the tread periphery along the center line $m_E$, that is in particular constant over its radial extent (FIG. 4), and a respective depth $t_a$ in a radial direction (FIGS. 3 and 6). The sipe edge portions 3a, as seen in cross section perpendicular to the center line $m_E$ (FIG. 6), also extend in a zigzag shape radially into the interior of the profile block 1 (FIGS. 2 and 6) and over their entire length $l_a$ lead into the cavities 4 already mentioned at the depth $t_a$ (FIGS. 2 and 3). The sipe walls 5 therefore, as seen in cross section perpendicular to the center line $m_E$, have a corresponding zigzag shape in the sipe edge portions in a radial direction (FIG. 6).

According to FIG. 4, the sipe main portion 3b has a length $l_b$, which is determined at the tread periphery along the center line $m_E$ and is in particular constant over its radial extent, of 65% to 90%, in particular of up to 85%, of the length $l_E$ of the sipe 3 and, as seen in plan view, at least over the majority of its length $l_b$, in particular over at least 70% of its length $l_b$, takes the form of a harmonic zigzag wave with a wavelength $\lambda_b$ and an amplitude $A_b$, wherein, in the exemplary embodiment shown, it extends for 2.5 wavelengths $\lambda_b$—i.e. in each case for 1.25 wavelengths $\lambda_b$ on each side of the plane of symmetry $E_1$. The wavelength $\lambda_b$ is 25% to 40%, in particular up to 33%, of the length $l_b$, the amplitude $A_b$ is 75% to 200%, in particular 125% to 175%, of the width $b_E$ of the sipe 3. The sipe main portion 3b also has a constant depth $t_b$ in a radial direction (FIGS. 3 and 5) of 10% to 30%, in particular of up to 25%, preferably of up to 20%, of the profile depth $T_1$ (FIG. 6), wherein, in the exemplary embodiment, the already mentioned zigzag shape of the sipe walls 5 that is formed in the sipe edge portions 3a in a radial direction continues in the sipe main portion 3b (FIGS. 2 and 5). In the exemplary embodiment shown, the depth $t_b$ of the sipe main portion 3b is selected such that the sipe main portion 3b, as seen in cross section perpendicular to the center line $m_E$, extends over a single jag and is therefore formed with a recumbent V shape (FIG. 5).

As shown by FIGS. 3, 4 and 6 in combination, the already mentioned cavities 4 each have a plane of symmetry $E_2$ extending in a radial direction and perpendicularly to the center line $m_E$ (FIGS. 3 and 4), a plane of symmetry $E_3$ extending orthogonally (perpendicularly) to the plane of symmetry $E_2$ and parallel to the tread periphery (FIGS. 3 and 6), and a plane of symmetry $E_4$ extending orthogonally (perpendicularly) to the plane of symmetry $E_2$ and containing the center line $m_E$ (FIGS. 4 and 6). The cavities 4 reach to a depth $t_{HR}$ in a radial direction with respect to the tread periphery (FIGS. 3 and 6) of 75% to 100%, in particular of up to 95%, of the profile depth $T_1$, are elongate in a radial direction, have a length $l_{HR}$ in a radial direction in the plane of symmetry $E_2$ (FIG. 3) of 25% to 45%, in particular of 30% to 40%, preferably of 33% to 37%, of the profile depth $T_1$ (FIG. 6), and have a width $b_{HR}$ in the plane of symmetry $E_3$ that is determined perpendicularly to the plane of symmetry $E_4$ (FIG. 6) of 200% to 500%, in particular of 300% to 400%, preferably of 330% to 370%, of the width $b_E$ (FIG. 6) of the sipe 3. As shown in FIG. 6, the cavities 4, as seen in cross section perpendicular to the center line $m_E$, take the form of rectangles, which have semicircles instead of the short sides. According to FIG. 3, the cavities 4 are also formed in such a way that they do not project beyond the sipe edge portions 3a, i.e. do not project into the region radially inside the sipe main portion 3b. The depth $t_{HR}$, the length $l_{HR}$ and the depth to are preferably matched to one another in such a way that the depth $t_a$ of the sipe edge portions 3a (FIGS. 3 and 6) is 200% to 400%, in particular 250% to 350%, particularly preferably 290% to 310%, of the depth $t_b$ of the sipe main portion 3b.

FIGS. 7a to 7d show cross sections through cavities $4^I$ to $4^{IV}$, which are variants of the cavity 4. The already mentioned depth $t_a$ of the sipe edge portions 3a is matched to the configuration of the cavities $4^I$ to $4^{IV}$ in such a way that the cavities $4^I$ to $4^{IV}$ reach to the already mentioned depth $t_{HR}$ (FIG. 3) of 75% to 100%, in particular of up to 95%, of the profile depth $T_1$.

The cavity $4^I$ (FIG. 7a) differs from the cavity 4 in that, as seen in cross section perpendicular to the center line $m_E$, it takes the form of an oval.

The cavity $4^{II}$ (FIG. 7b) differs from the cavity 4 in that, as seen in cross section perpendicular to the center line $m_E$, it takes the form of a rectangle with edges that are rounded along quarter circles, for example.

The cavity $4^{III}$ (FIG. 7c) is symmetrical exclusively with respect to the mentioned planes of symmetry $E_2$ and $E_4$, is droplet-shaped as seen in cross section perpendicular to the centre line $m_E$ and is composed of a radially outer chamber part $4^{III}a$ and a radially inner chamber part $4^{III}b$, wherein the radially inner chamber part $4^{III}b$ has a larger volume than the radially outer chamber part $4^{III}a$. The radially inner chamber part $4^{III}b$, as seen in cross section perpendicular to the center line $m_E$, substantially takes the form of an isosceles trapezoid that is elongate in a radial direction, wherein the base of the trapezoid (longer base side) adjoins the radially outer chamber part $4_{III}a$. The radially outer chamber part $4^{III}a$, as seen in cross section perpendicular to the center line $m_E$, takes the form of an isosceles triangle, wherein the triangle sides are concavely curved, i.e. curved inward, in relation to one another. All the corner regions of the cavity $4_{III}$ are also rounded.

The cavity $4^{IV}$ (FIG. 7d) has a circular cross section with a diameter $d_{HR}$ of 200% to 500%, in particular of 300% to 400%, preferably of 330% to 370%, of the width $b_E$ (FIGS. 4 to 6) of the sipe 3.

The invention is not limited to the exemplary embodiments described.

The tread of the tire has at least one profile rib, which runs around in the circumferential direction and is traversed by the sipes, wherein the profile rib is optionally structured with traversing transverse grooves in profile blocks and/or in the manner of a block with transverse grooves ending in the manner of blind grooves. The profile rib is delimited at least on one side by a circumferential groove, which extends in any desired manner, for example in a zigzag shape, in plan view and into which the sipes lead over a respective sipe edge portion. Such profile ribs in particular include shoulder-side profile ribs, in which traversing sipes reach at least to the corresponding lateral edge of the contact patch (footprint determined under standard conditions and on a tire mounted on a standard wheel rim, at a load of 70% of maximum load-bearing capacity and an internal pressure of 85% of standard pressure, in accordance with ETRTO standards). The sipes can extend at an angle of 0° to 50° in relation to the axial direction—with respect to their center lines—in plan view. The sipes in plan view can also extend in any desired way, for example in a straight line or in an arc shape or wave shape overall or in certain portions. In the case of sipes that extend in an arc shape at least in certain portions, the center lines follow the arcuate shape, wherein the angle at which such sipes extend in relation to the axial direction is determined with respect to a line extending in a straight line in plan view and connecting the ends of the center line.

LIST OF REFERENCE SIGNS

1 Profile block
2a Circumferential groove
2b Transverse groove
3 Sipe
3a Sipe edge portion
3b Sipe main portion
4, $4^I$ to $4^{IV}$ Cavity
$4'''a$ Radially outer chamber part
$4'''b$ Radially inner chamber part
5 Sipe wall
$A_b$ Amplitude
$b_E$, $b_{HR}$ Width
$d_{HR}$ Diameter
$E_1$, $E_2$, $E_3$, $E_4$ Plane of symmetry
$l_a$, $l_b$, $l_E$, $l_{HR}$ Length
$m_E$ Center line
$t_a$, $t_b$, $t_{HR}$ Depth
$T_1$ Profile depth
$\lambda_b$ Wavelength

The invention claimed is:

1. A pneumatic vehicle tire comprising:
a tread having a profile rib which runs in a circumferential direction;
the profile rib delimited on its opposite sides by respective circumferential grooves formed to a profile depth (T1),
the profile rib being traversed by a plurality of sipes, which extend parallel to one another and at an angle of 0° to 50° in relation to the axial direction at least in groups in plan view, and have a width (bE) of 0.4 mm to 3.0 mm,
wherein each sipe has a sipe main portion extending over the majority of its extent and has respective sipe edge portions that each lead into each circumferential groove delimiting the profile rib, wherein the sipe main portion and the sipe edge portions have respective depths (ta, tb) in a radial direction and the depth (ta) of the sipe main portion differs from the depth (tb) of the sipe edge portions;
wherein the depth (tb) of the sipe main portion is less than the depth (ta) of the sipe edge portions, wherein, in the interior of the profile rib, each of the sipe edge portions leads into a cavity that extends from the circumferential groove and is made wider than the sipe, wherein the depth (ta) of the sipe edge portions is 200% to 400% of the depth (tb) of the sipe main portion, wherein each sipe edge portion inside the profile rib extends over its entire extent into the cavity, and wherein the depth (tb) of the sipe main portion is 10% to 30% of the profile depth (T1), and each cavity, viewed in cross-section of the sipe, is elongated in the radial direction and has a length (lHR) of 25% to 45% of the profile depth (T1) in the radial direction.

2. The tire of claim 1, wherein at its widest point and as seen in the cross section of the sipe (3), each cavity (4, 4I to 4IV) has a width (bHR) from 200% to 500% of the width (bE) of the sipe (3).

3. The tire of claim 1, wherein each cavity (4, 4I to 4IV) in a radial direction reaches to a depth (tHR) from 75% to 100% of the profile depth (T1).

4. The tire of claim 1, wherein the depth (tb) of the sipe main portion (3b) is 10% to 30% of the profile depth (T1).

5. The tire of claim 1, wherein, as seen in cross section of the sipe, each of the sipe edge portions extends in the form of a wave.

6. The tire of claim 5, wherein the shape of the wave that is present in the cross section of the sipe in each of the sipe edge portions continues in the sipe main portion.

7. The tire of claim 1, wherein, as seen in plan view, each of the sipe edge portions extends in a straight line.

8. The tire of claim 1, wherein, as seen in plan view, the sipe main portion, at least over the majority of its extent extends in the form of a wave.

9. The tire of claim 8, wherein the wavelength ($\lambda b$) of the wave of the sipe main portion is 25% to 40% of the length (lb) determined along the center line (mE) of the sipe.

10. The tire of claim 8, wherein the amplitude (Ab) of the wave of the sipe main portion is 75% to 200% of the width (bE) of the sipe.

11. The tire of claim 1, wherein the sipe main portion has a length (lb), determined along the center line (mE) of the sipe, of 65% to 90%, of the length (lE) of the sipe that is determined correspondingly.

12. The tire of claim 1, wherein each cavity (4, 4I to 4IV) has a plane of symmetry (E4) which extends in a radial direction and contains the center line (mE) of the sipe that is aligned in the direction of extent of the sipe in plan view.

13. The tire of claim 1, wherein:

as seen in plan view, each sipe edge portion extends in a straight line, and as seen in plan view, the sipe main portion, at least over the majority of its extent, extends in the form of a wave.

14. The tire of claim 13, wherein:

as seen in cross section of the sipe, each sipe edge portion extends in the form of a wave, and the form of the wave present in the sipe edge portions continues in the sipe main portion.

15. The tire of claim 14, wherein the cavities are only present in the sipe edge portions, and the sipe main portion is devoid of a cavity at its base.

* * * * *